United States Patent
Hoppe et al.

(10) Patent No.: US 11,269,615 B2
(45) Date of Patent: Mar. 8, 2022

(54) AUTOMATICALLY ORCHESTRATING DEPLOYMENTS OF SOFTWARE-DEFINED STORAGE STACKS

(71) Applicant: EMC IP Holding Company LLC, Hopkinton, MA (US)

(72) Inventors: Alexander Hoppe, Worcester, MA (US); Alik Saring, Westborough, MA (US); Ian D. Bibby, Murrieta, CA (US); Trevor H. Dawe, Riverview (CA); Sean R. Gallacher, Moncton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/935,490

(22) Filed: Jul. 22, 2020

(65) Prior Publication Data
US 2022/0027137 A1    Jan. 27, 2022

(51) Int. Cl.
*G06F 8/65*    (2018.01)
*G06F 9/48*    (2006.01)

(52) U.S. Cl.
CPC .............. *G06F 8/65* (2013.01); *G06F 9/4881* (2013.01)

(58) Field of Classification Search
CPC .................................. G06F 8/65; G06F 9/4881
See application file for complete search history.

(56) References Cited

U.S. PATENT DOCUMENTS

| | | | |
|---|---|---|---|
| 9,992,276 B2 | 6/2018 | Barzik et al. | |
| 10,169,019 B2 | 1/2019 | Dain et al. | |
| 10,324,643 B1* | 6/2019 | Huang | G06F 3/0607 |
| 10,637,921 B2 | 4/2020 | Barzik et al. | |
| 2016/0294948 A1* | 10/2016 | Chen | H04L 63/10 |
| 2017/0090779 A1* | 3/2017 | Barzik | G06F 3/0653 |
| 2017/0206034 A1* | 7/2017 | Fetik | G06F 21/78 |
| 2018/0143815 A1* | 5/2018 | Dain | G06F 8/60 |
| 2018/0143888 A1 | 5/2018 | Barzik et al. | |
| 2018/0143895 A1 | 5/2018 | Dain et al. | |
| 2018/0143898 A1* | 5/2018 | Dain | G06F 11/3684 |
| 2018/0165122 A1* | 6/2018 | Dobrev | G06F 9/45558 |
| 2019/0146707 A1* | 5/2019 | Fetik | G06F 3/0653 |
| | | | 711/154 |

* cited by examiner

*Primary Examiner* — Phillip H Nguyen
(74) *Attorney, Agent, or Firm* — Ryan, Mason & Lewis, LLP

(57) ABSTRACT

Methods, apparatus, and processor-readable storage media for automatically orchestrating deployments of software-defined storage stacks are provided herein. An example computer-implemented method includes obtaining a software-defined storage deployment request from at least one user; determining a request type associated with the software-defined storage deployment request by processing at least a portion of payload content of the software-defined storage deployment request; orchestrating one or more tasks required for carrying out the requested software-defined storage deployment based at least in part on the determined request type and the processed payload content; and performing at least one automated action based at least in part on the one or more orchestrated tasks.

20 Claims, 13 Drawing Sheets

```
Input: Deployment request (http POST)
Output: Task(s) status
OperationTypes = string{Deploy, CreatePool, UpdatePool, RemoveDevice}
ValidStorageTypes = string{FileStorageType, BlockStorageType} function DeploymentRequest(w http.ResponseWriter, r *http.Request) {
    if r.Method != http.MethodPost {
        return error
    }

ReadRequestBody(r.Body)
    if err != nil {
        return error
    } var payload ChangeRequestPayload
    if err := Unmarshal(data, &payload); err != nil {
        return error
    } err = ValidateRequest(payload)
    if err != nil {
        return error
    } if len(payload.stackdeployments) == 1 {
        OrchestrateSingleStack(payload.ChangeRequest)
    } else {
        OrchestrateMultipleStacks(payload.ChangeRequest)
    } w.WriteHeader(http.StatusAccepted)
}
```

FIG. 4

```
function ValidateRequest(payload ChangeRequestPayload) error {
    // The request must contain at least one stack deployment
    if len(payload.stackdeployments) == 0 {
        return error
    }

// The request must have a ID
    if payload.ID == "" {
        return error
    }

// The request must have a task ID
    if payload.TaskID == "" {
        return error
    } validOperationType := false
    for _, operation := range payload.stackdeployments {
        // Verify the operation type is correct
        for _, opType := range OperationTypes {
            if operation.OperationType == opType {
                validOperationType = true
                break
            }
        }
        if validOperationType == false {
            return error
        }

// Verify all operations contain a stack name
        if operation.StackName == "" {
            return error
        }
    }
    return nil
}
```

FIG. 4 (cont.)

```
function OrchestrateSingleStack(request DeploymentRequest) {
    // Get the stack controller service that will execute the deployment.
    stackControllerURL, err := getStackController(request.StackName)
    if err != nil {
        log error // Couldn't find stack controller that execute the deployment.
    }
    _, err = UpdateTask(request.TaskID)
    if err != nil {
        log error // If task could not be create or updated for existing task.
    }
    // Send the request to the stack controller
    SendStackControllerRequest(request, stackControllerURL)
}
```

FIG. 4 (cont.)

```
function OrchestrateMultipleStacks(request DeploymentRequest) {
    // Break out deployment requests into their own request instances, sorted by sequence
    // execution order
    opRequests, err := ProcessChangeRequestOperations(request)
    if err != nil {
        if opRequests != nil {
            // Mark any/all requests as error
            for _, req := range opRequests {
                if req.TaskID != "" {
                    handleError(err, req.TaskID)
                }
            }
        }
        return
    }

// Persist these opRequests in key/value store, where key is the parent task ID.
    PersistRequestGroupJob(request.TaskID, opRequests)
    // Send the first opRequest immediately to the stack controller. The coordinator will listen for
    // its task update and if completed, send the 2nd request to the controller. If it's found to be in
    // an error state, then mark all tasks as error.
    SendToStackControllerJob(opRequests[0])
}

// PersistRequestGroupJob adds a job for persisting the slice of requests into
// the placement operations datastore.
function PersistRequestGroupJob(parentTaskID string, requests []DeploymentRequest) {
    Save(parentTaskID, requests)
}
```

FIG. 4 (cont.)

```
// SendToStackControllerJob adds a job for sending the given DeploymentRequest to its
// designated stack controller.
function SendToStackControllerJob(request DeploymentRequest) {
    StoreDeploymentProcessorQueue (
        OrchestrateSingleStack(request))
}

// HandleTaskUpdateNotificationJob is intended to be called on receiving a task
// update notification.
// If the task is associated with a group of requests, depending on the update state
// the remaining requests in the group will either be marked as error or sent to
// their stack controller.
func (s *Service) HandleTaskUpdateNotificationJob(t Task) {
    // retrieve group associated with this task
    reqGroup, err := Datastore.GetByTaskID(t.ID)
    if err != nil {
        return
    }

// Get the slice index of this task
    var currReqIdx int
    for i, req := range reqGroup {
        if req.TaskID == t.ID {
            currReqIdx = i
        }
    }

// Based on the task status, decide what to do with remaining requests in group
    for _, req := range reqGroup[currReqIdx+1:] {
        switch t.Status {
            case Task.Success:
                SendToStackControllerJob(req)
                break
            case Task.Error:
                handleError("Marking as failed"), req.TaskID)
        }
    }
}
```

FIG. 4 (cont.)

```
function ProcessChangeRequestOperations(request DeploymentRequest) ([]DeploymentRequest, error) {
    // Result slice with size equal to the number of deployment
    result := make([]DeploymentRequest, 0, len(request.stackdeployments))

// Sort operations by their sequence number
    ops := request.stackdeployments
    sort.Slice(ops, func(i, j int) bool {
        return ops[i].SequenceNumber < ops[j].SequenceNumber
    })

// Map each operation to their own ChangeRequest
    for _, op := range request.stackdeployments {
        taskDescription := op.OperationType + "/" + op.StackName
        task, err := Task.CreateChildTask(taskDescription, request.TaskID)
        if err != nil {
            return nil, errors
        } opRequest := deployment.ChangeRequest{
            TaskID: task.ID,
            Placement: preview.Placement{
                ID:              request.ID,
                GenerationTime: request.GenerationTime,
                Operations:     []preview.Operation{op},
            },
        }
        result = append(result, opRequest)
    }
    return result, nil
}
```

FIG. 4 (cont.)

```
// handleError logs the error message and updates the task with the error message
function handleError(err error, taskID string) {
    log.Printf("%+v", err)
    UpdateTask(taskID, fmt.Sprintf("%s", err.Error()), taskPayload.Completed, taskPayload.Error)
} function UpdateTask(ID string, errorMessage string, state taskPayload.Stage, status taskPayload.Status) {
    updateTaskPayload := taskPayload.UpdateTask{Logs: errorMessage, Stage: state, Status: status}
    _, err := Task.UpdateTask(ID, updateTaskPayload)
    // If an error occurs with the task service, log it.
    if err != nil {
        log.Printf("task service is not available for updating %q: %+v", ID, err)
    }
}
```

FIG. 4 (cont.)

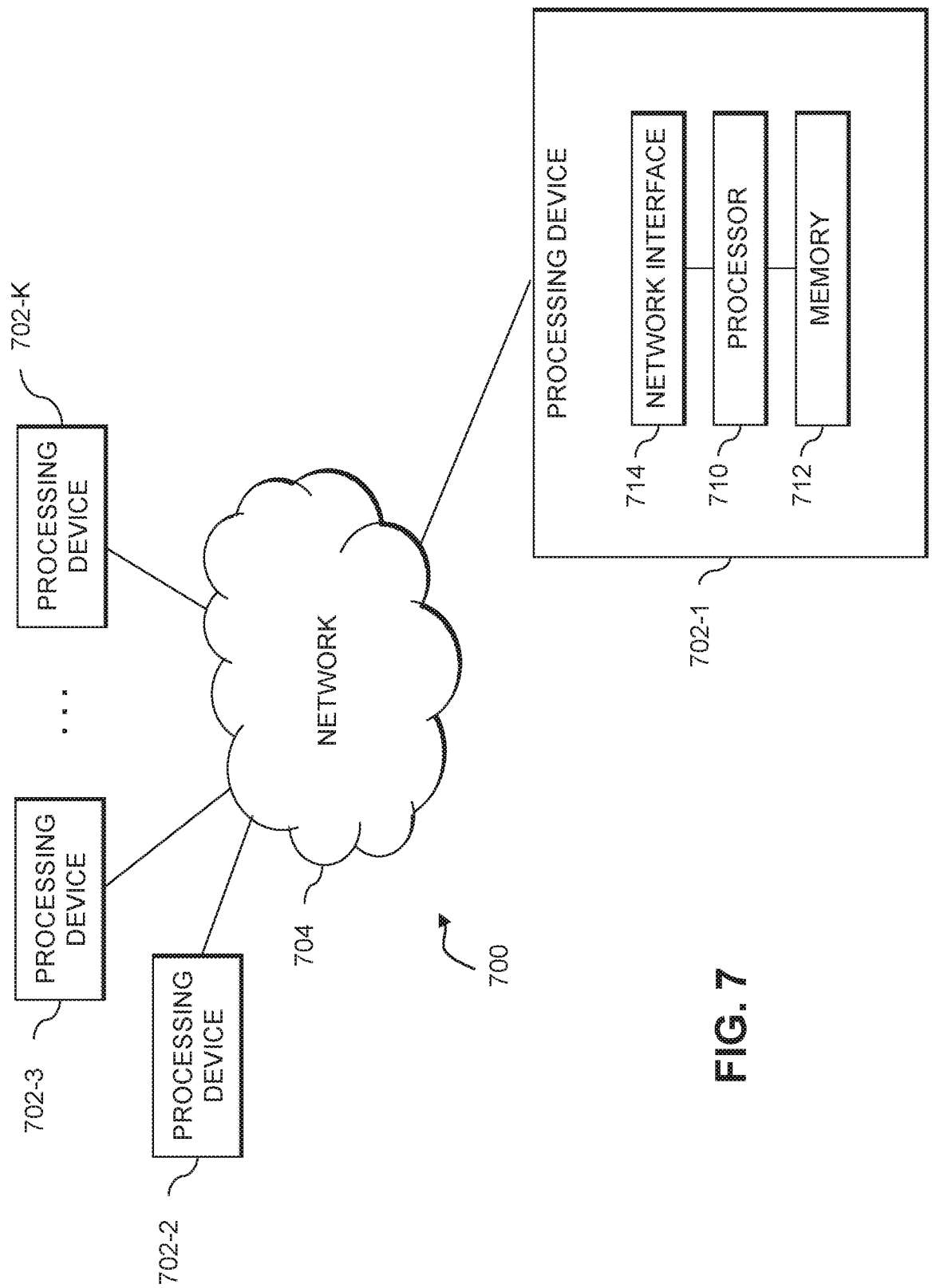

AUTOMATICALLY ORCHESTRATING DEPLOYMENTS OF SOFTWARE-DEFINED STORAGE STACKS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to storage in such systems.

BACKGROUND

Software-defined storage stacks typically have unique sets of requirements and preconditions to be met for successful deployment. Such unique sets of requirements and preconditions can depend, for example, on whether the desired deployment involves a single storage stack, layered storage stacks, or an update to an existing storage stack. However, such determinations, in accordance with conventional storage approaches, typically involve manual analysis and intervention, which can often be error-prone and resource-intensive.

SUMMARY

Illustrative embodiments of the disclosure provide techniques for automatically orchestrating deployments of software-defined storage stacks. An exemplary computer-implemented method includes obtaining a software-defined storage deployment request from at least one user, and determining a request type associated with the software-defined storage deployment request by processing at least a portion of payload content of the software-defined storage deployment request. The method also includes orchestrating one or more tasks required for carrying out the requested software-defined storage deployment based at least in part on the determined request type and the processed payload content, and performing at least one automated action based at least in part on the one or more orchestrated tasks.

Illustrative embodiments can provide significant advantages relative to conventional storage approaches. For example, problems associated with error-prone and resource-intensive software-defined storage stack deployment determinations are overcome in one or more embodiments through automated orchestration of one or more deployment-specific tasks required for carrying out requested software-defined storage deployments.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for automatically orchestrating deployments of software-defined storage stacks in an illustrative embodiment.

FIGS. 6 and 7 show examples of processing platforms that may be utilized to implement at least a portion of an information processing system in illustrative embodiments.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
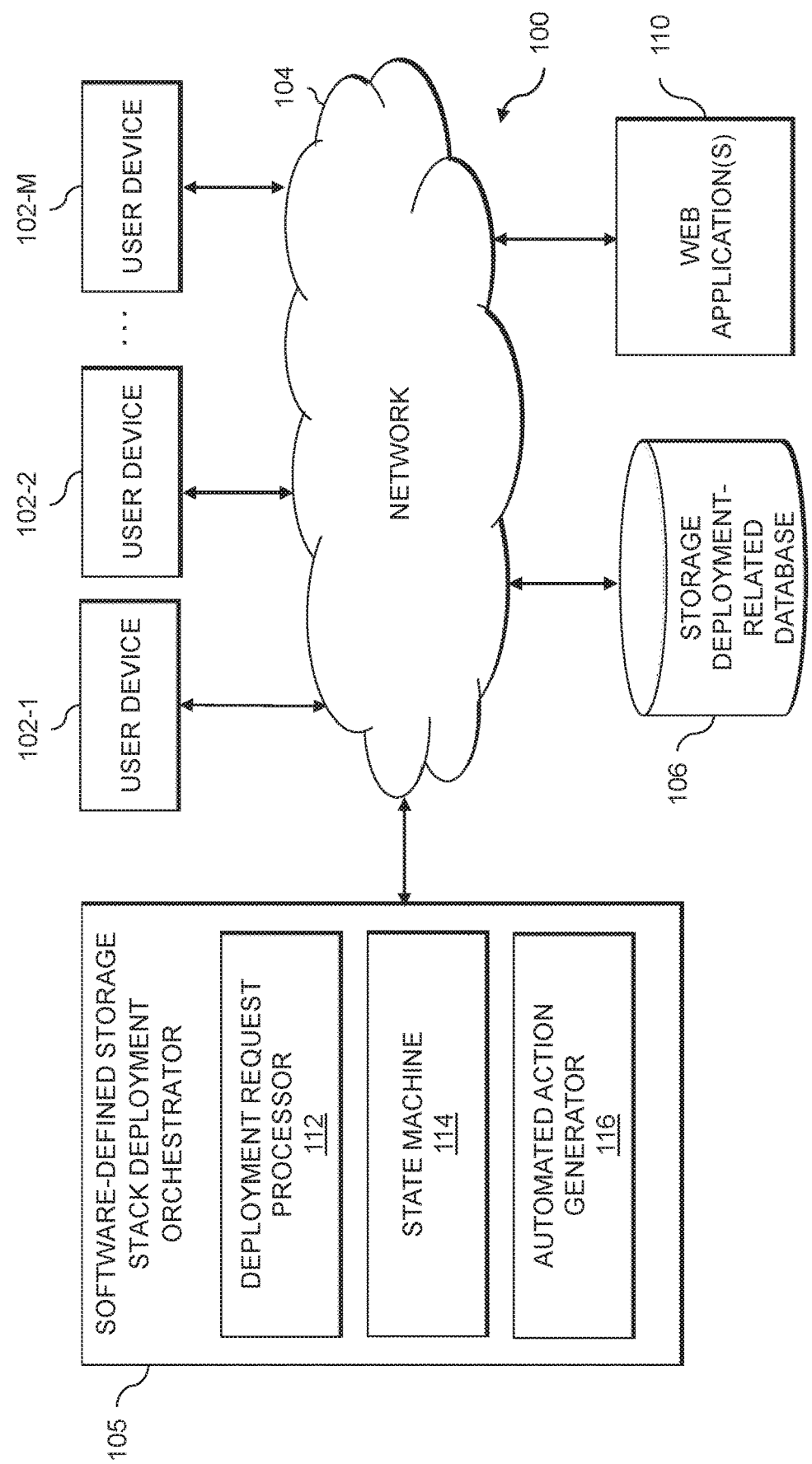
FIG. 1 shows an information processing system configured for automatically orchestrating deployments of software-defined storage stacks in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is software-defined storage stack deployment orchestrator 105 and web application(s) 110 (e.g., storage deployment applications, monitoring applications, etc.).

The user devices 102 may comprise, for example, mobile telephones, laptop computers, tablet computers, desktop computers or other types of computing devices, including devices associated with storage systems. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the software-defined storage stack deployment orchestrator 105 can have an associated database 106 configured to store data pertaining to software-defined storage stack deployment information, which comprise, for example, layer-related information, stack-related status information, and controller information associated with one or more particular users and/or storage systems.

The database 106 in the present embodiment is implemented using one or more storage systems associated with software-defined storage stack deployment orchestrator 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with software-defined storage stack deployment orchestrator 105 are one or more input-output devices, which illustratively comprise keyboards, displays or other types of input-output devices in any combination. Such input-output devices can be used, for example, to support one or more user interfaces to software-defined storage stack deployment orchestrator 105, as well as to support communication between software-defined storage stack deployment orchestrator 105 and other related systems and devices not explicitly shown.

Additionally, software-defined storage stack deployment orchestrator 105 in the FIG. 1 embodiment is assumed to be implemented using at least one processing device. Each such processing device generally comprises at least one processor and an associated memory, and implements one or more functional modules for controlling certain features of software-defined storage stack deployment orchestrator 105.

More particularly, software-defined storage stack deployment orchestrator 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows software-defined storage stack deployment orchestrator 105 to communicate over the network 104 with the user devices 102, and illustratively comprises one or more conventional transceivers.

The software-defined storage stack deployment orchestrator 105 further comprises deployment request processor 112, state machine 114, and automated action generator 116.

It is to be appreciated that this particular arrangement of modules 112, 114 and 116 illustrated in the software-defined storage stack deployment orchestrator 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automatically orchestrating deployments of software-defined storage stacks involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of software-defined storage stack deployment orchestrator 105, storage deployment-related database 106, and web application(s) 110 can be on and/or part of the same processing platform.

An exemplary process utilizing modules 112, 114 and 116 of an example software-defined storage stack deployment orchestrator 105 in computer network 100 will be described in more detail with reference to the flow diagram of FIG. 5.

Accordingly, one or more embodiments include generating and/or providing a mechanism to validate and orchestrate software-defined storage stack deployment requests and stack update requests, as well as to dispatch such requests to the appropriate specialized stack controller(s). In the case of a layered storage service deployment request, at least one embodiment includes determining the correct sequence in which to invoke the underlying stack controllers with the correct operation(s). Also, in the case of a modification request for an existing storage stack, one or more embodiments include looking-up details of the existing storage service, validating the change request, and invoking the appropriate stack controller(s). Whether a request pertains to modifying an existing storage stack or implementing a new storage stack, at least one embodiment includes generating and monitoring deployment-related tasks. As used herein, an operation refers to a set of instructions to be executed (e.g., "Install storage stack A"), and a task refers to an in-memory object that tracks the current state of an operation (e.g., "Step installing storage stack A: success").

As further detailed herein, in one or more embodiments, an orchestration mechanism interprets an incoming request type by examining the corresponding payload. The content of the payload indicates if the request is for deployment of a new single storage stack, deployment of one or more new layered storage stacks, or an update to an existing storage stack (such as, for example, storage capacity expansion or reduction).

Figure 2:
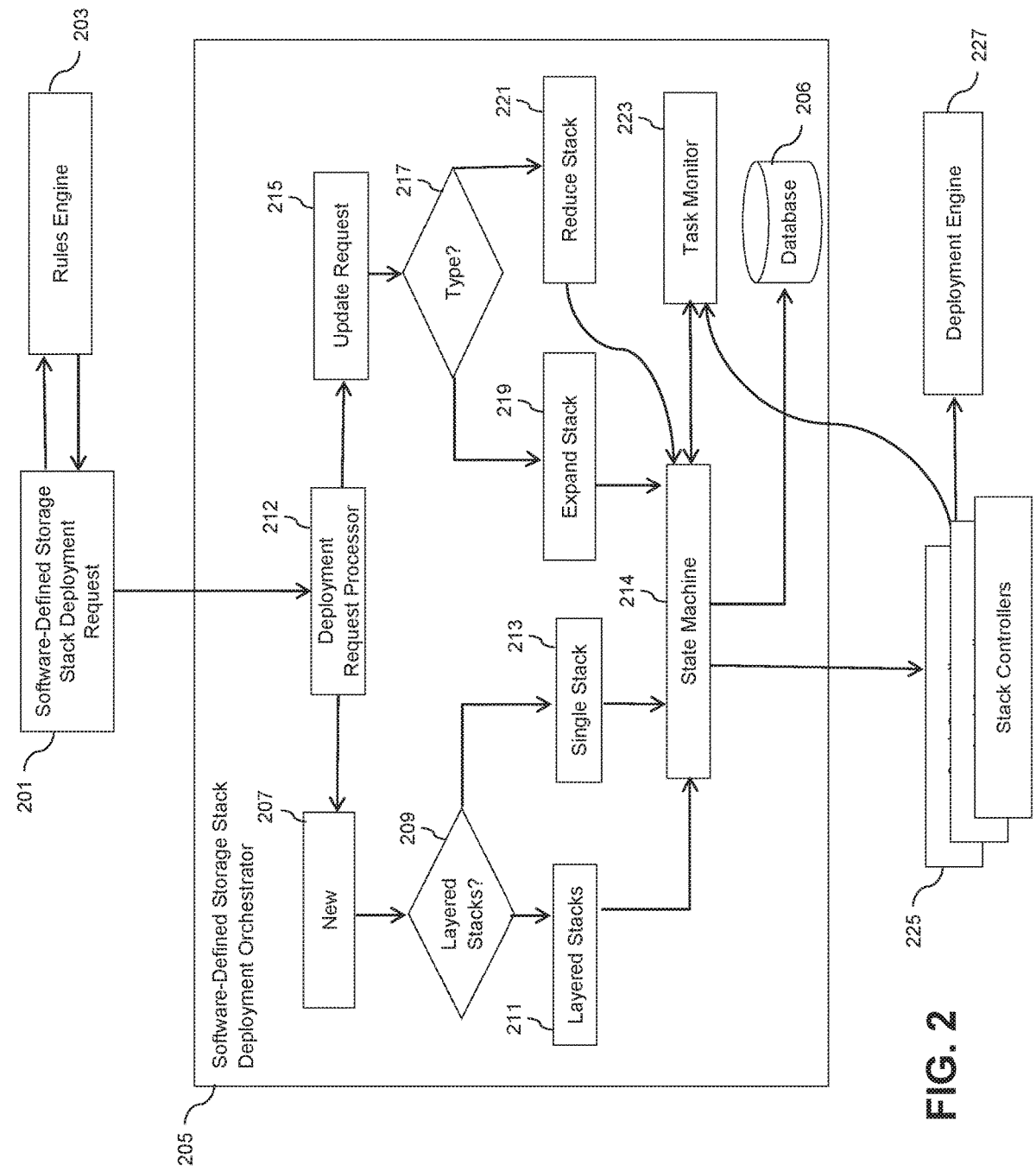
FIG. 2 shows an example workflow of a software-defined storage stack deployment orchestrator in an illustrative embodiment.

FIG. 2 shows an example workflow of a software-defined storage stack deployment orchestrator in an illustrative embodiment. By way of illustration, as depicted in FIG. 2, a software-defined storage stack deployment request 201, subsequent to engaging with rules engine 203, is sent to the software-defined storage stack deployment orchestrator 205. The rules engine 203 validates the software-defined storage stack deployment request 201 and determines if the managed inventory can satisfy the software-defined storage stack deployment request 201. The rules engine 203 also determines the dependencies and sequence of each operation. Within the software-defined storage stack deployment orchestrator 205, deployment request processor 212 identifies whether the deployment request 201 is a new deployment request 207 or an update request 215 (e.g., an elastic request) for an existing software stack.

In connection with a new deployment request 207, the software-defined storage stack deployment orchestrator 205, in step 209, determines whether the new deployment request 207 is for multiple layered stacks in one request 211 or for a single stack deployment request 213. For a layered deployment request 211, the software-defined storage stack deployment orchestrator 205 identifies how many stacks are being requested in the single request, identifies dependencies of one stack to another (within the layered set of stacks), and determines and/or sets the order of execution as input to state machine 214. By way of illustration, if the software-defined storage stack deployment orchestrator 205 determines that the software-defined storage stack deployment request 201 comprises a layered deployment, the software-defined storage stack deployment orchestrator 205 executes one or more operations based on the software-defined storage stack deployment request 201 and a known set of deployment rules. For example, assume that the request 201 is to install Storage Stack C, and in such an example, the software-defined storage stack deployment orchestrator 205 knows that Storage Stack C has two prerequisites: Storage Stack A and Storage Stack B. Therefore, the software-defined storage stack deployment orchestrator 205 executes operations (i.e., instructions) to install Storage Stack A first (Operation 1), Storage Stack B second (Operation 2), and finally Storage Stack C (Operation 3).

State machine 214 sequentially manages the deployment of the multiple stacks (within the layered set of stacks) without requiring any further input from the user. For a single stack deployment request 213, the software-defined storage stack deployment orchestrator 205 determines and/or sets the operation(s) for single software stack deployment and dispatches the request to state machine 214. For example, if the software-defined storage stack deployment orchestrator 205 sees a request with a single operation (which has been provided by the rules engine 203), the software-defined storage stack deployment orchestrator 205 initiates the deployment of the base storage stack (e.g., Storage Stack A) and dispatches to a function call that holds the specific set of instructions for this storage stack.

Additionally, in the case of either a layered deployment request 211 or a single stack deployment request 213, state machine 214 determines the order in which operations are to be executed, as well as which stack controller(s) (among a set of stack controllers 225) will carry out the deployment (s). In at least one embodiment, each operation has a storage stack name that is used to identify the correct stack controller to call. For example, if the "operation.StackName" of the requested storage stack is "Storage Stack B," then the software-defined storage stack deployment orchestrator 205 dispatches the stack controller for Storage Stack B. State machine 214 then sends such deployment commands to the appropriate stack controller(s) 225.

In connection with an update request 215, the software-defined storage stack deployment orchestrator 205 determines, in step 217, whether the update involves an expansion 219 of storage capacity or a reduction 221 of storage capacity for an existing stack. The software-defined storage stack deployment orchestrator 205 collects necessary metadata to determine whether the requested operations can be performed in one task or if other tasks are required before carrying out the request 215. Such information is then sent to state machine 214.

In at least one example embodiment, the software-defined storage stack deployment orchestrator 205 processes a hypertext transfer protocol (HTTP) request and payload to determine what type of update will be performed on a storage pool. The rules engine 203 further processes the request 201 to construct a single operation with the details of how the storage pool will be updated (e.g., what nodes and/or devices need to be added to the storage pool, what nodes and/or devices need to be removed from the storage pool, etc.). The number of required tasks can be determined, for example, based on the type of update request.

By way merely of illustration, consider a first example involving a request 201 to expand a storage pool of Storage Stack A with a new device (e.g., a storage disk). The payload of such a request can include, for instance:
{
"size": "500 GB"
}

Analysis of this payload provides the software-defined storage stack deployment orchestrator 205 the following required information to determine what to do: Storage Stack A ID; Storage Pool ID; the size (in gigabytes (GB)) by which to increase the capacity of the storage pool of Storage Stack A; and based on the particulars of the request 201, this operation can be identified as an "UpdatePool" operation rather than a "Deploy," "CreatePool," or "RemoveDevice" operation. Accordingly, the software-defined storage stack deployment orchestrator 205 can create a single task to perform this operation, as there are no dependencies for Storage Stack A.

By way of further illustration, consider a second example involving a request 201 to expand a storage pool of Storage Stack B. The payload of such a request can include, for instance:
{
"size": "10 TB"
}

The software-defined storage stack deployment orchestrator 205 determines that this is an expansion request for Storage Stack B, and that there is a known dependency on Storage Stack A. The software-defined storage stack deployment orchestrator 205 will create two operations and two tasks, the first being to expand the storage pool in Storage Stack A (see example 1 above, for example). This is a prerequisite to expand the storage pool on Stack B. Upon completion of the first task, the software-defined storage stack deployment orchestrator 205 then proceeds to the next dependent operation to expand the pool of Storage Stack B.

In the case of a capacity expansion request 219, the software-defined storage stack deployment orchestrator 205 may require, in conjunction with state machine 214, adding one or more devices to the existing stack before performing the expansion of storage capacity. Also, in such an embodiment, the software-defined storage stack deployment orchestrator 205 retrieves existing stack information via database 206 and/or stack controllers 225 and forwards a complete and/or updated expansion request to state machine 214.

In the case of a capacity reduction request or a request to delete one or more devices, the software-defined storage stack deployment orchestrator 205 executes, in conjunction with state machine 214, necessary data consistency steps before performing the reduction. Also, in such an embodiment, the software-defined storage stack deployment orchestrator 205 retrieves existing stack information via database 206 and/or stack controllers 225 and forwards a complete and/or updated reduction request to state machine 214.

As also depicted in FIG. 2, for all process deployment requests, state machine 214 sends deployment task details to task monitor 223 so that progress of deployments can be monitored. In one or more embodiments, the state machine 214 is aware of any inter-task dependencies in a scenario wherein multiple tasks have been created for deployments and/or stack modifications. Additionally, state machine 214 persists task information in database 206. Further, as noted above, state machine 214 engages with one or more of the stack controllers 225, which then invoke(s) deployment engine 227 to carry out the deployments. The stack controller(s) 225 can also provide updates pertaining to the status of one or more tasks to task monitor 223.

Accordingly, in connection with one or more embodiments, for a single software-defined storage stack deployment request, a state machine examines the stack type and dispatches the request to the appropriate stack controller for execution. The state machine also generates a task to monitor the deployment status. Also, in connection with at least one embodiment, for a layered software-defined storage deployment, the software-defined storage stack deployment orchestrator examines the corresponding operation sequence numbers to determine and/or ensure that the layered deployment occurs in the correct order. For example, consider a use case wherein Storage Stack B is layered on top of Storage Stack A. In such an example, the successful deployment of Storage Stack A is a prerequisite for deployment of Storage Stack B. Accordingly, the software-defined storage stack deployment orchestrator dispatches the deployment request for Storage Stack A and monitors a corresponding task status. Only if the Storage Stack A deployment was successful does the software-defined storage stack deployment orchestrator commence deployment of Storage Stack B. In one or more embodiments, no additional user interaction is required. Also, as detailed herein, a multi-layered storage stack can be deployed by a single request.

Additionally or alternatively, as noted herein, in at least one embodiment, the software-defined storage stack deployment orchestrator supports elasticity by delegating an update operation on an existing storage stack. In such an embodiment, the software-defined storage stack deployment orchestrator retrieves details of the existing software-defined storage stack from the appropriate stack controller(s), and dispatches the update request (e.g., a request to expand stack capacity, a request to reduce stack capacity, etc.) to the appropriate stack controller(s).

Further, one or more embodiments include generating and/or implementing architecture that is extensible such that additional stack controllers can be added with only minor changes to the software-defined storage stack deployment orchestrator. For example, a Storage Stack C may be introduced (to an environment previously including only a Storage Stack A and a Storage Stack B), wherein Storage Stack C has a new stack controller and one or more layered dependencies on Storage Stack A as well as Storage Stack B. In such an example embodiment, the software-defined storage stack deployment orchestrator can initiate one or more appropriate workflows by inspecting operation sequence information, and can also invoke the appropriate stack controller(s) based at least in part on analysis of the stack type.

Figure 3:
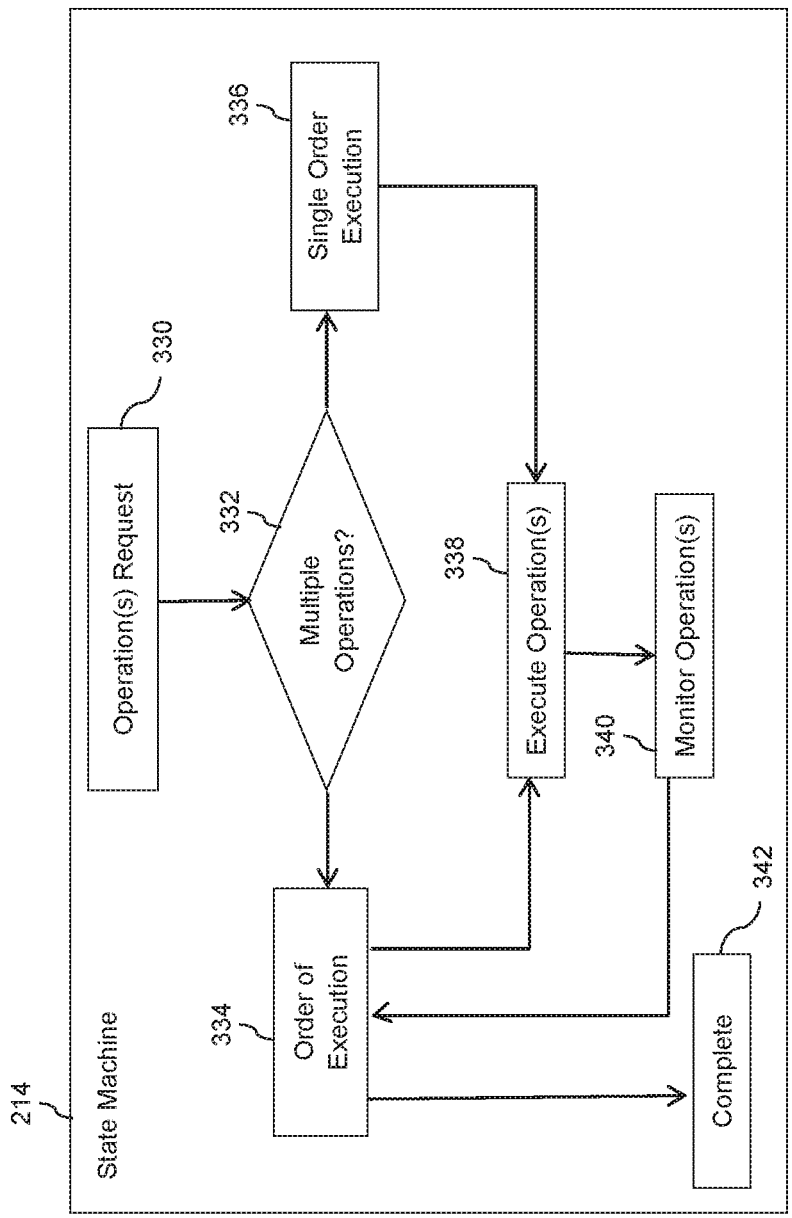
FIG. 3 shows an example workflow of a state machine in an illustrative embodiment.

FIG. 3 shows an example workflow of a state machine in an illustrative embodiment. By way of illustration, FIG. 3 depicts an expanded version of state machine 214 illustrated in FIG. 2. Specifically, FIG. 3 depicts determining, via step 332, whether a given operation(s) request 330 corresponds to a single operation (also referred to herein as a task) or multiple operations. As noted herein, for multi-stack deployments, there are often tasks that need to be completed successfully before other tasks can be started. Accordingly, for a single operation, state machine 214 identifies and/or generates a single order execution 336, while for multiple operations, state machine 214 determines an exact order of execution 334 for the multiple operations. Additionally, state machine 214 executes, in step 338, the operation or operations, and monitors, in step 340, the successful completion of the operation or operations. In a multiple operation sequence, monitoring can include determining completion of a given operation before any other dependent operations are commenced and/or executed. At the conclusion of the monitoring step (e.g., when it has been determined that all operations have been executed), completion is indicated at step 342.

In one or more embodiments, task or operation execution can be carried out in connection with one or more stack controllers. In such an embodiment, a task identifier (ID) is generated for each task and/or operation, and is provided to a task monitoring service (e.g. component 223 in FIG. 2), as deployment tasks can be asynchronous. Additionally, once a deployment request is accepted, a response is generated and sent back. One or more example embodiments include using a representational state transfer (RESTful) interface, wherein requests are made by using a uniform resource locator (URL) and a request body, and a response is an HTTP code with an optional message. Examples of HTTP response codes for a deployment creation can include 202 (accepted) or 500 (error). An example of the optional message can include, for instance, "Deployment accepted, monitor progress via Task [Task ID]." Also, the response can be received by a REST client that can interface via a graphical user interface (GUI).

As also detailed in FIG. 3, a state machine monitors the progress of tasks and reports to an order of execution module upon task completion or determination of an error state so that an execution engine can proceed with the next step(s) in the order according to the result from the previous step and/or task. A task can fail for a variety of reasons, and details of those reasons can be compiled, in one or more embodiments, in a task status report (generated, for example, by a monitoring component). Ultimately, all tasks are marked as complete with a status of either successful completion or failure.

FIG. 4 shows an example code snippet for automatically orchestrating deployments of software-defined storage stacks in an illustrative embodiment. In this embodiment, example code snippet 400 is executed by or under the control of at least one processing system and/or device. For example, the example code snippet 400 may be viewed as comprising a portion of a software implementation of at least part of software-defined storage stack deployment orchestrator 105 of the FIG. 1 embodiment.

The example code snippet 400 illustrates a "DeploymentRequest" function which receives a request as input as part of an HTTP request body. The function identifies the request method and validates that the request payload is in a format that can be interpreted and processed. Also, example code snippet 400 illustrates a "ValidateRequest" function which checks that the request contains at least one deployment request, that a task has been generated to track the deployment workflow(s), that the deployment type ("Deploy," "CreatePool," "UpdatePool," etc.) is valid for the provided request, and that a known storage stack name is provided with the request. If the request payload is directed to the deployment of a single-layered storage stack, example code snippet 400 can include invoking the "OrchestrateSingleStack" workflow. If the request payload is directed to a storage stack that requires a layered deployment, example code snippet 400 can include invoking the "OrchestrateMultipleStacks" workflow. Ultimately, an HTTP status of "202: Accepted" can be returned, given that the basic request validation has passed.

As noted above and further illustrated via example code snippet 400, an "OrchestrateSingleStack" function invokes a stack controller for a base storage stack deployment by looking-up the correct stack controller from the service registry using the stack name in the request. The function updates the corresponding task with a new progress status and dispatches the request to the identified stack controller.

As also noted above and further illustrated via example code snippet 400, an "OrchestrateMultipleStacks" function breaks out deployment requests into their own request instance, sorted by sequence execution order. The function invokes "ProcessChangeRequestOperations" to sort the required operations by their respective sequence numbers, and assigns an individual "ChangeRequest" to each operation. In turn, the function also generates a related child task for each layered deployment under the overall deployment parent task. The "OrchestrateMultipleStacks" function then stores the deployment sequence in a database table for persistence. Further, the function dispatches the first operation to the appropriate stack controller and listens for the related task update. If completed successfully, the function will send the next operation to its respective stack controller, and so on.

It is to be appreciated that this particular example code snippet shows just one example implementation of code for automatically orchestrating deployments of software-defined storage stacks, and alternative implementations of the process can be used in other embodiments.

Figure 5:
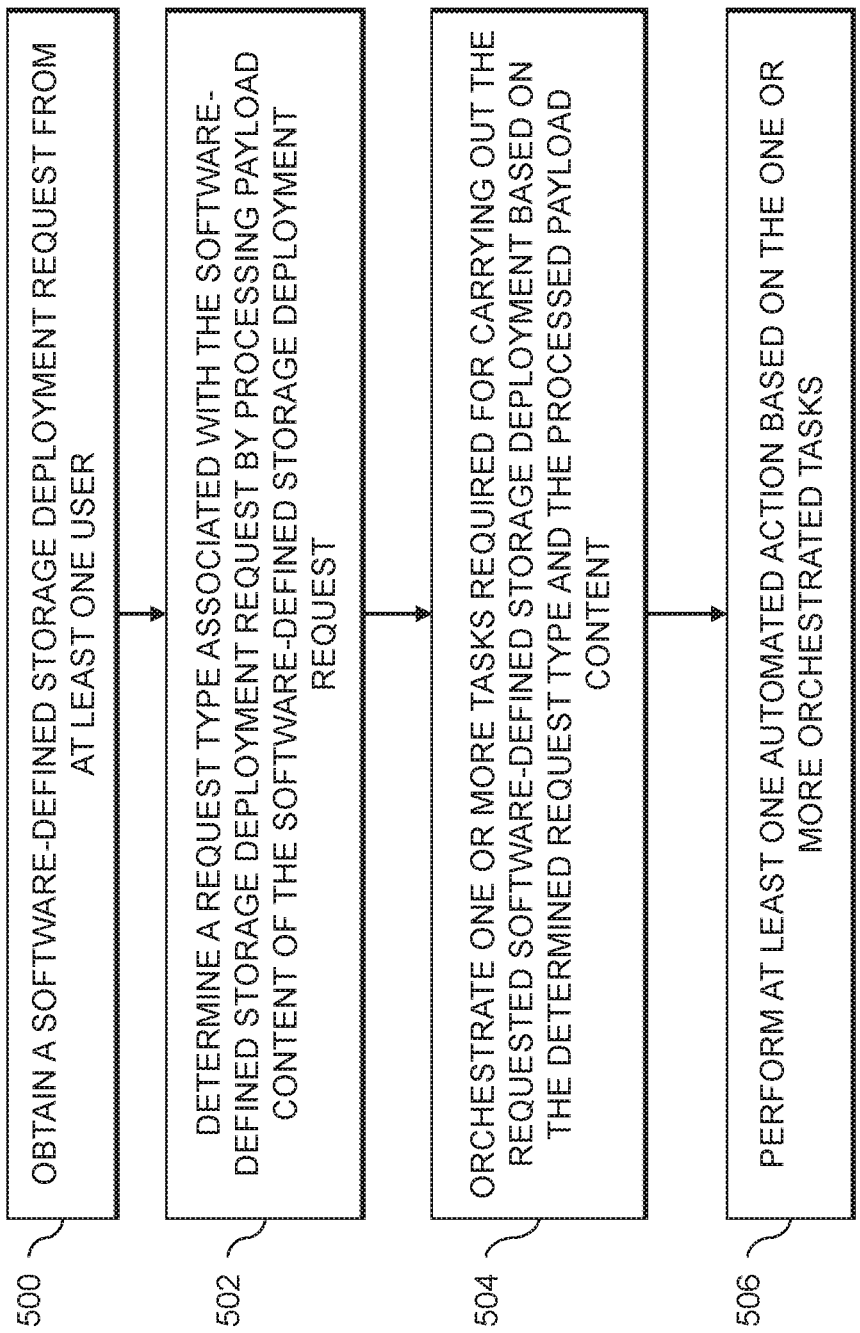
FIG. 5 is a flow diagram of a process for automatically orchestrating deployments of software-defined storage stacks in an illustrative embodiment.

FIG. 5 is a flow diagram of a process for automatically orchestrating deployments of software-defined storage stacks in an illustrative embodiment. It is to be understood that this particular process is only an example, and additional or alternative processes can be carried out in other embodiments.

In this embodiment, the process includes steps 500 through 506. These steps are assumed to be performed by the software-defined storage stack deployment orchestrator 105 utilizing its modules 112, 114 and 116.

Step 500 includes obtaining a software-defined storage deployment request from at least one user. Step 502 includes determining a request type associated with the software-defined storage deployment request by processing at least a portion of payload content of the software-defined storage deployment request. In at least one embodiment, determining the request type includes determining whether the software-defined storage deployment request pertains to deployment of a single software-defined storage stack, deployment of one or more layered software-defined storage stacks, or an update to at least one existing software-defined storage stack. Also, in such an embodiment, determining whether the software-defined storage deployment request pertains to an update to at least one existing software-defined storage stack includes determining that the software-defined storage deployment request includes one of a request to expand storage capacity in connection with the at least one existing software-defined storage stack and a request to reduce storage capacity in connection with the at least one existing software-defined storage stack.

Step 504 includes orchestrating one or more tasks required for carrying out the requested software-defined storage deployment based at least in part on the determined request type and the processed payload content. In at least one embodiment, orchestrating the one or more tasks required for carrying out the requested software-defined storage deployment includes determining an execution order for at least a portion of the one or more tasks. Additionally or alternatively, at least one embodiment includes determining one or more dependencies among software-defined storage stacks related to the software-defined storage deployment request. In such an embodiment, orchestrating the one or more tasks required for carrying out the requested software-defined storage deployment includes orchestrating the one or more tasks based at least in part on the determined request type, the processed payload content, and the one or more determined dependencies.

Step 506 includes performing at least one automated action based at least in part on the one or more orchestrated tasks. In at least one embodiment, performing the at least one automated action includes determining one or more appropriate stack controllers for executing the one or more orchestrated tasks and/or outputting information pertaining to the one or more orchestrated tasks to at least one stack controller for execution. Additionally or alternatively, at least one embodiment includes monitoring execution of the one or more orchestrated tasks.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically orchestrate one or more deployment-specific tasks required for carrying out requested software-defined storage deployments. These and other embodiments can effectively overcome problems associated with error-prone and resource-intensive software-defined storage stack deployment determinations of conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
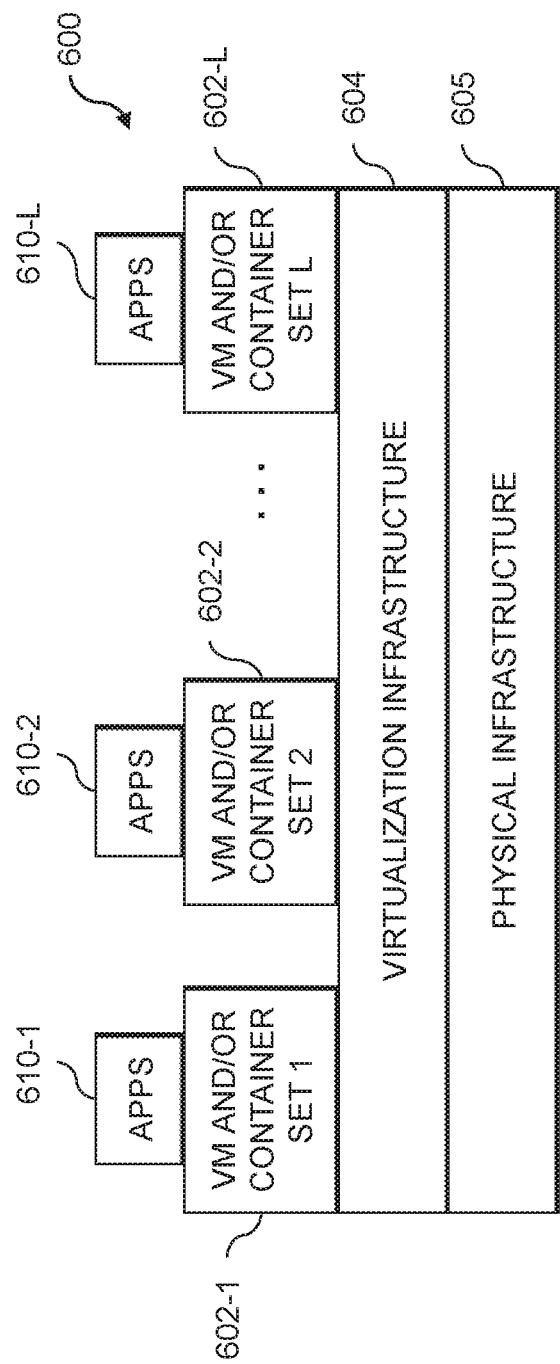

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining a software-defined storage deployment request from at least one user;
   determining a request type associated with the software-defined storage deployment request, from a set of request types consisting of (i) request types pertaining to deployment of a single software-defined storage stack, (ii) request types pertaining to deployment of one or more layered software-defined storage stacks, and (iii) request types pertaining to an update to at least one existing software-defined storage stack, by processing at least a portion of payload content of the software-defined storage deployment request;
   orchestrating one or more tasks required for carrying out the requested software-defined storage deployment based at least in part on the determined request type and the processed payload content; and
   performing at least one automated action based at least in part on the one or more orchestrated tasks;
   wherein the method is performed by at least one processing device comprising a processor coupled to a memory.

2. The computer-implemented method of claim 1, wherein determining that the software-defined storage deployment request is a request type pertaining to an update to at least one existing software-defined storage stack comprises determining that the software-defined storage deployment request comprises one of a request to expand storage capacity in connection with the at least one existing software-defined storage stack and a request to reduce storage capacity in connection with the at least one existing software-defined storage stack.

3. The computer-implemented method of claim 1, wherein orchestrating the one or more tasks required for carrying out the requested software-defined storage deployment comprises determining an execution order for at least a portion of the one or more tasks.

4. The computer-implemented method of claim 1, further comprising:
   determining one or more dependencies among software-defined storage stacks related to the software-defined storage deployment request.

5. The computer-implemented method of claim 4, wherein orchestrating the one or more tasks required for carrying out the requested software-defined storage deployment comprises orchestrating the one or more tasks based at least in part on the determined request type, the processed payload content, and the one or more determined dependencies.

6. The computer-implemented method of claim 1, wherein performing the at least one automated action comprises outputting information pertaining to the one or more orchestrated tasks to at least one stack controller for execution.

7. The computer-implemented method of claim 1, further comprising:
   monitoring execution of the one or more orchestrated tasks.

8. The computer-implemented method of claim 1, wherein performing the at least one automated action comprises determining one or more appropriate stack controllers for executing the one or more orchestrated tasks.

9. A non-transitory processor-readable storage medium having stored therein program code of one or more software programs, wherein the program code when executed by at least one processing device causes the at least one processing device:
- to obtain a software-defined storage deployment request from at least one user;
- to determine a request type associated with the software-defined storage deployment request, from a set of request types consisting of (i) request types pertaining to deployment of a single software-defined storage stack, (ii) request types pertaining to deployment of one or more layered software-defined storage stacks, and (iii) request types pertaining to an update to at least one existing software-defined storage stack, by processing at least a portion of payload content of the software-defined storage deployment request;
- to orchestrate one or more tasks required for carrying out the requested software-defined storage deployment based at least in part on the determined request type and the processed payload content; and
- to perform at least one automated action based at least in part on the one or more orchestrated tasks.

10. The non-transitory processor-readable storage medium of claim 9, wherein orchestrating the one or more tasks required for carrying out the requested software-defined storage deployment comprises determining an execution order for at least a portion of the one or more tasks.

11. The non-transitory processor-readable storage medium of claim 9, wherein the program code when executed by the at least one processing device causes the at least one processing device:
- to determine one or more dependencies among software-defined storage stacks related to the software-defined storage deployment request.

12. The non-transitory processor-readable storage medium of claim 11, wherein orchestrating the one or more tasks required for carrying out the requested software-defined storage deployment comprises orchestrating the one or more tasks based at least in part on the determined request type, the processed payload content, and the one or more determined dependencies.

13. The non-transitory processor-readable storage medium of claim 9, wherein performing the at least one automated action comprises outputting information pertaining to the one or more orchestrated tasks to at least one stack controller for execution.

14. The non-transitory processor-readable storage medium of claim 9, wherein performing the at least one automated action comprises determining one or more appropriate stack controllers for executing the one or more orchestrated tasks.

15. An apparatus comprising:
- at least one processing device comprising a processor coupled to a memory;
- the at least one processing device being configured:
  - to obtain a software-defined storage deployment request from at least one user;
  - to determine a request type associated with the software-defined storage deployment request, from a set of request types consisting of (i) request types pertaining to deployment of a single software-defined storage stack, (ii) request types pertaining to deployment of one or more layered software-defined storage stacks, and (iii) request types pertaining to an update to at least one existing software-defined storage stack, by processing at least a portion of payload content of the software-defined storage deployment request;
  - to orchestrate one or more tasks required for carrying out the requested software-defined storage deployment based at least in part on the determined request type and the processed payload content; and
  - to perform at least one automated action based at least in part on the one or more orchestrated tasks.

16. The apparatus of claim 15, wherein orchestrating the one or more tasks required for carrying out the requested software-defined storage deployment comprises determining an execution order for at least a portion of the one or more tasks.

17. The apparatus of claim 15, wherein the at least one processing device being further configured:
- to determine one or more dependencies among software-defined storage stacks related to the software-defined storage deployment request.

18. The apparatus of claim 17, wherein orchestrating the one or more tasks required for carrying out the requested software-defined storage deployment comprises orchestrating the one or more tasks based at least in part on the determined request type, the processed payload content, and the one or more determined dependencies.

19. The apparatus of claim 15, wherein performing the at least one automated action comprises outputting information pertaining to the one or more orchestrated tasks to at least one stack controller for execution.

20. The apparatus of claim 15, wherein performing the at least one automated action comprises determining one or more appropriate stack controllers for executing the one or more orchestrated tasks.

* * * * *